(12) United States Patent
Ross et al.

(10) Patent No.: US 10,599,204 B1
(45) Date of Patent: Mar. 24, 2020

(54) PERFORMANCE EFFICIENCY MONITORING SYSTEM

(71) Applicant: Amazon Technologies, Inc., Seattle, WA (US)

(72) Inventors: Peter George Ross, Olympia, WA (US); Adolfo Bravo Ferreira, Seattle, WA (US); Michael P. Czamara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 15/197,570

(22) Filed: Jun. 29, 2016

(51) Int. Cl.
*G06F 1/3228* (2019.01)
*G06F 1/28* (2006.01)
*G06F 11/34* (2006.01)
*G06F 11/30* (2006.01)
(Continued)

(52) U.S. Cl.
CPC .............. *G06F 1/3228* (2013.01); *G06F 1/28* (2013.01); *G06F 1/3203* (2013.01); *G06F 9/5094* (2013.01); *G06F 11/3058* (2013.01); *G06F 11/3452* (2013.01); *Y02D 10/22* (2018.01)

(58) Field of Classification Search
CPC .. G01D 4/004; G01R 21/133; Y02B 70/3266; Y02B 90/242; Y02B 90/245; Y04S 20/242; Y04S 20/322; Y04S 20/38; Y04S 20/40; G06F 1/3203; G06F 9/5094; G06F 11/3058; G06F 11/3452
See application file for complete search history.

(56) References Cited

U.S. PATENT DOCUMENTS

| 9,910,472 | B1* | 3/2018 | Wishman | G06F 1/30 |
| 2008/0288286 | A1* | 11/2008 | Noreen | G06Q 10/06 705/2 |
| 2009/0234512 | A1* | 9/2009 | Ewing | H04L 12/10 700/295 |

(Continued)

OTHER PUBLICATIONS

Industry Perspectives on Jun. 26, 2012, "Debunking Data Center Power Myths", Industry Perspectives on Jun. 26, 2012, downloaded from http://www.datacenterknowledge.com/archives/2012/06/26/debunkingdatacenterpowermyths/, pp. 1-4.

(Continued)

*Primary Examiner* — Terrell S Johnson
(74) *Attorney, Agent, or Firm* — Robert C. Kowert; Kowert, Hood, Munyon, Rankin & Goetzel, P.C.

(57) ABSTRACT

A monitoring system may receive data indicating work performed by a set of computing devices during a given period of time and may receive data indicating an amount of power consumed by the set of computing devices and support systems that support the set of computing devices during the given period of time. The monitoring system may normalize the amounts of work performed by different types of computing devices in the set and determine an aggregate amount of work performed by the set. The monitoring system may also determine an aggregate amount of electrical power consumed by the set of computing devices and support system that support the set of computing devices during the given period of time. A monitoring system may use the aggregate amount of work performed and aggregate amount of power consumed during the given period of time to determine a performance index efficiency for the set.

20 Claims, 12 Drawing Sheets

(51) Int. Cl.
*G06F 1/3203* (2019.01)
*G06F 9/50* (2006.01)

(56) References Cited

U.S. PATENT DOCUMENTS

| | | | | |
|---|---|---|---|---|
| 2009/0265568 | A1* | 10/2009 | Jackson | G06F 1/3203 713/320 |
| 2014/0371936 | A1* | 12/2014 | Kamel | G01R 21/1333 700/291 |
| 2015/0309095 | A1* | 10/2015 | Monnerie | G01R 21/133 702/60 |
| 2017/0139462 | A1* | 5/2017 | Potlapally | G06F 1/28 |
| 2017/0353362 | A1* | 12/2017 | Harutyunyan | H04L 41/5016 |
| 2018/0101416 | A1* | 4/2018 | Fu | G06F 9/5094 |

OTHER PUBLICATIONS

U.S. Appl. No. 14/643,983, filed Mar. 10, 2015, Felipe Enrique Ortega Gutierrez, et al.

ABB Decathlon (TM), "Data center infrastructure management—Operation intelligence for agile business", From URL: www.abb.com/datacenters/decathlon, 2013, pp. 1-8.

U.S. Appl. No. 14/572,700, filed Dec. 16, 2014, Felipe Enrique Ortega Gutierrez, et al.

U.S. Appl. No. 14/572,694, filed Dec. 16, 2014, Felipe Enrique Ortega Gutierrez, et al.

U.S. Appl. No. 13/907,073, filed May 31, 2013, Nachiketh Rao Potlapally, et al.

U.S. Appl. No. 14/737,470, filed Jun. 11, 2015, Max Jesse Wishman, et al.

* cited by examiner

PERFORMANCE EFFICIENCY MONITORING SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Because a computing facility may contain a large number of servers, a large amount of infrastructure and support systems may be required to support computing capacity, storage capacity, and data transfer capacity of the data center. In particular, a large amount of cabling infrastructure equipment, electrical distribution infrastructure equipment, network communication infrastructure equipment, air cooling infrastructure equipment, etc. may be required to support data operations by servers in a data center at any given time.

For many computing facilities, costs of electrical power consumed by server, network, and support systems make up a significant portion of overall costs for operating the computing facilities.

Figure 1:
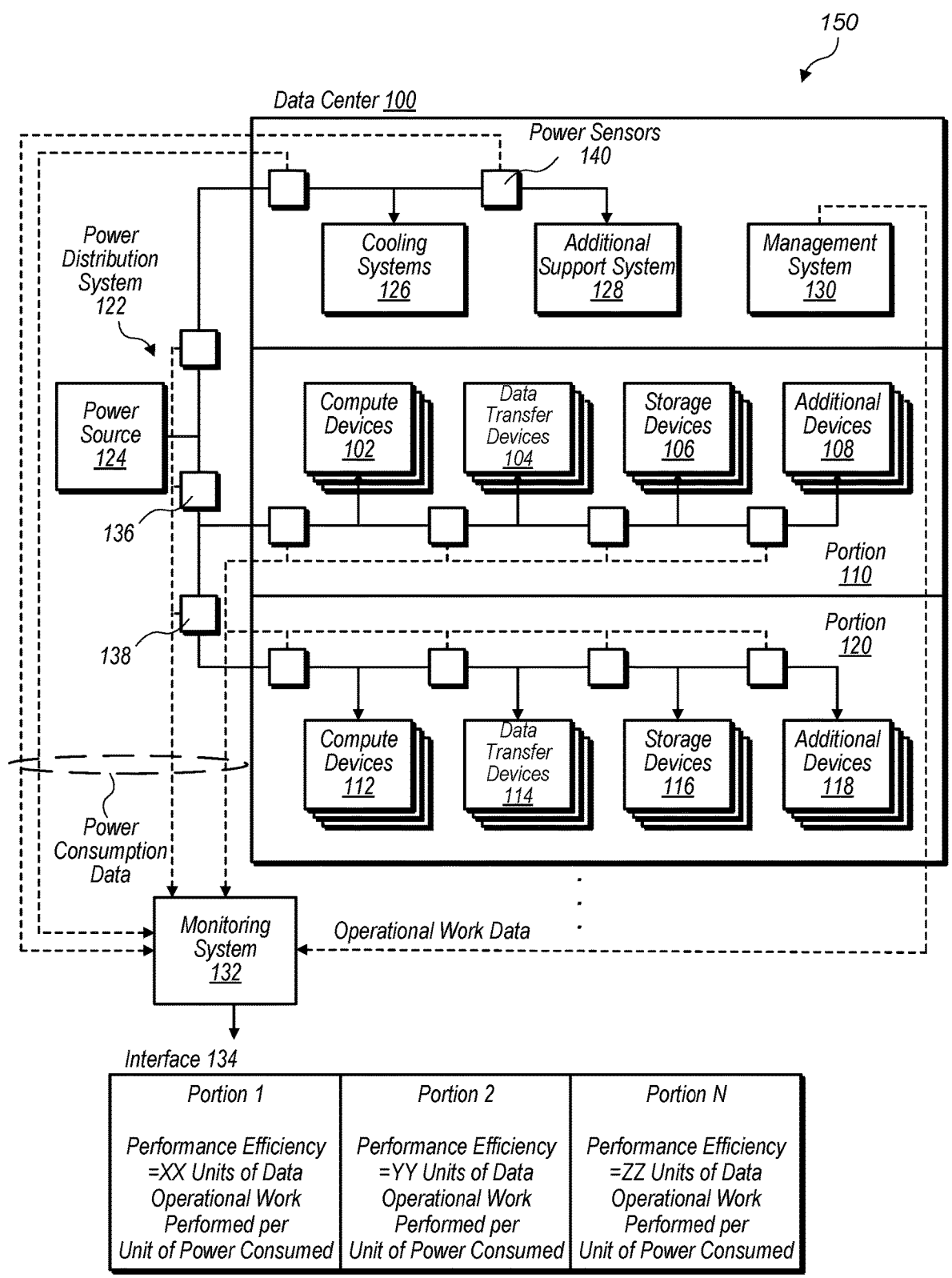
FIG. 1 is a schematic diagram illustrating a system which includes a data center and a performance efficiency monitoring system for monitoring efficiency of work done by components or portions of the data center, according to some embodiments.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems, apparatuses and methods for monitoring efficiencies of computing devices are disclosed.

According to some embodiments, a data center includes computing devices configured to perform data operational work. The data operational work comprises computational work, data transfer work, or data storage work. For example, a particular computing device of a data center may be a compute server, a storage server, a piece of networking equipment such as a router or switch, or another type of computing device configured to perform compute work, data storage work, data transfer work, or another type of data operational work. The data center also includes a power distribution system configured to distribute electrical power from an electrical power source to respective sets of the computing devices in the data center and to support equipment that support the respective sets of computing devices in the data center. For example, a data center may include a power distribution system configured to distribute electrical power to servers, switches, and routers in different portions of the data center and to distribute electrical power to support systems that provide support to the servers, switches, and routers in the different portions of the data center. For example, the power distribution system may distribute electrical power to cooling systems, lighting systems, building management systems, security systems, etc. The data center also includes a monitoring system configured to determine an amount of data operational work performed over a period of time by a particular set of the respective sets of computing devices, wherein the amount of data operational work comprises an amount of computational work, data transfer work, or data storage work performed by the particular set of computing devices over the period of time. The monitoring system is also configured to determine an amount of electrical power consumed over the period of time by the particular set of computing devices and by a portion of the support equipment that support the particular set of computing devices. The monitoring system is further configured to determine a performance efficiency for the particular set of computing devices, wherein the performance efficiency indicates an amount of data operational work performed by the particular set of computing devices per unit of electrical power consumed by the particular set of computing devices and the support equipment that support the particular set of computing devices.

According to some embodiments, a method includes determining an amount of data operational work performed over a period of time by a set of computing devices; determining an amount of electrical power consumed over the period of time by the set of computing devices and by support equipment that supports the set of computing devices; and determining a performance efficiency for the set of computing devices, wherein the performance efficiency indicates an amount of data operational work performed by the set of computing devices per unit of electrical power consumed by the set of computing devices and by the support equipment that supports the set of computing devices.

According to one embodiment, a non-transitory computer readable storage medium stores program instructions that when executed on a computing device implements a monitoring system that receives data indicating data operational work performed by a set of computing devices and data indicating power consumption; determines an amount of data operational work performed over a period of time by the set of computing devices; determines an amount of electrical power consumed over the period of time by the set of computing devices and support equipment supporting the set of computing devices; and determines a performance efficiency for the set of the computing devices, wherein the performance efficiency indicates an amount of data operational work performed by the set of computing devices per unit of electrical power consumed by the set of computing devices and the support equipment supporting the set of computing devices.

As used herein, "computing" includes any operations that can be performed by a computer, such as computation, data storage, data retrieval, or communications.

As used herein, "computer room" means a room of a building in which computer systems, such as rack-mounted servers, are operated.

As used herein, "computing device" includes any of various computer systems or components thereof. One example of a computing device is a rack-mounted server. Another example of a computing device is a network switch or router. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein an "instance" may refer to an allocated amount of resources of a network based service allocated to a customer to perform various data operations on behalf of the customer, such as data storage operations, data transfer operations, or computational operations. For example, an instance may be implemented using portions of computing capabilities, storage capabilities, and data transfer capabilities of one or more computing devices of a network based service and may be offered to customers of the network based service to perform data operational work. In some embodiments, an "instance" may have a particular capacity to perform computational operations, may be configured to store up to a particular amount of data, and may be configured to send or receive a particular amount of data in a given amount of time.

As used herein, "data center" includes any facility or portion of a facility in which computer operations are carried out. A data center may include servers and other systems and components dedicated to specific functions (e.g., e-commerce transactions, database management) or serving multiple functions. Examples of computer operations include information processing, communications, simulations, and operational control.

As used herein, "data operational work" includes useful work performed by computing devices configured to perform a particular type of useful work. For example, a computing device may be configured to perform computational work, and data operational work performed by the computing device may be a computational operation performed by the computing device. In some embodiments, data operational work may be measured as a quantity of data operations performed during a period of time or may be measured as an amount of data storage capacity made available during a period of time. For example, data operational work may be measured in units of floating point operations performed per second (FLOPS), bytes of data transferred per second, a quantity of storage made available over a period of time, a quantity of packets transmitted during a period of time, an amount of services provided during a period of time, or any other suitable measure of useful work performed by a computing device during a period of time.

As used herein, "normalize" means to make data conform to a common measurement standard. For example, "normalized" data may be data that is converted from a particular measurement scale to another measurement scale.

As used herein, "room", "hall", etc. means a room, space, enclosure, etc. of a structure. A "computer room" means a room in which computer systems, such as rack-mounted servers, are operated.

A data center may include multiple computing devices configured to perform data operational work, such as computing operations, data storage operations, data transfer operations, load balancing operations, firewall operations, or various other types of useful data operational work. In addition a data center may include one or more support systems that provide support services to the computing devices such as a cooling system that removes waste heat from the computing devices of the data center. In addition a data center may include other support systems that provide support services to computing devices of the data center, such as a building management system, security system, lighting system, or various other support systems. Also, a data center may include a power distribution system configured to distribute electrical power from a power source, such as a utility power source, battery, generator, or other power source. The power distribution system may distribute electrical power to computing devices in a data center and support systems of the data center.

Some data centers, may monitor power usage effectiveness (PUE), which may be defined as a ratio of a total amount of power consumed by the facility to an amount of power consumed by information technology equipment (IT) in the facility. However, a PUE measurement may not capture differences in efficiencies of IT equipment. For example, some power consumed by a piece of IT equipment may be inefficiently used by the IT equipment. Or said another way, some pieces of IT equipment may perform more useful work while consuming a certain amount of electrical power than other pieces of IT equipment. For example, a particular compute server may perform X compute operations in a given amount of time while consuming a given amount of power to perform the compute operations, whereas another compute server may perform 1.25× compute operations in the same given amount of time while consuming the same given amount of power. Thus, the other compute server may perform 1.25 times the useful work during the given amount of time as the first server. However, PUE calculations for the two compute servers may indicate the two compute servers have the same power utilization effectiveness or PUE.

In another example, a PUE calculation may mask inefficient operations. For example, an operator of a data center may decide to raise temperature set-points for cooling systems for the data center, such as HVAC systems, in order to reduce overall power consumption by the facility. However, IT equipment in the facility may consume additional power in order to operate at higher temperatures. For example fans in IT equipment may run more frequently or for longer durations when the facility is operating at the higher temperatures. In some situations an amount of additional power consumed by the IT equipment running at higher temperatures may be greater than an amount of reduction in power consumed by HVAC systems running at the higher temperature set-points. In a PUE calculation, because all power consumed by a piece of IT equipment is considered to be "efficiently" consumed power, actual PUE measurements for the facility may incorrectly indicate improved efficiency for the facility, when in reality the facility is actually consuming more electrical power to perform the same amount of data operational work when being operated at the higher temperatures.

In some embodiments, in order to more accurately measure how efficiently a facility that includes computing devices and support systems that support the computing devices are being operated, a monitoring system may be configured to determine a performance index efficiency. The performance index efficiency may take into account the efficiency of IT equipment in addition to the efficiency of support systems in a facility, such as cooling systems. For example, a performance index efficiency may be defined as a ratio of useful data operational work performed by computing devices in a facility to an amount of electrical power consumed by the computing devices and pieces of support equipment that support the computing devices.

For example, a set of computing devices may include computing devices in a computer room of a data center. A performance index efficiency for the set of computing devices may be defined as useful data operational work performed by the computing devices in the computer room of the data center during a period of time divided by an amount of electrical power consumed by the computing devices in the computer room and support systems that support the computing devices in the computer room of the data center during the period of time. Support systems that support the set of computing devices may include a cooling system that cools the computer room, lighting for the computer room, a security system that monitors the computer room, and other support systems that support a computer room in which the set of computing devices is located.

Because a performance index efficiency is determined based on an amount of useful data operational work performed by computing devices included in the performance index efficiency measurement, differences in efficiencies between computing devices may be discernible in performance index efficiency measurements. For example two compute servers may operate in a same rack of a data center and consume approximately the same amount of electrical power during a given period of time. Also approximately the same amount of electrical power may be consumed by support systems that support the two compute servers in the rack during the given period of time. However, one of the two compute servers may perform 2× the quantity of compute operations, such as floating point operations (FLOPS), during the period of time as compared to the other compute server. In such circumstances the compute server that performs 2× the quantity of compute operations during the period of time will have a performance index efficiency that shows the compute server to be twice as efficient as the other compute server. Whereas, a PUE calculation would show the two servers to have the same efficiency because the two compute servers consume the same amount of electrical power and are located in a common facility that consumes a given amount of electrical power.

In some embodiments, useful data operational work performed by computing devices may be normalized by converting the data operational work measured in units specific to a particular type of computing device into performance index units that are measured on a common measurement scale that is common to different types of computing devices. In some embodiments, in order to determine normalized amounts of data operational work performed by a particular type of computing device in performance index units, an amount of data operational work performed by the particular computing device in measurement units specific to the particular type of computing device may be divided by a theoretical or known benchmark capacity for the particular type of computing device measured in the measurement units specific to the particular type of computing device to determine an amount of data operational work in performance index units. For example, a switch may transmit 1,000 packets in a given amount of time, and a benchmark capacity for switches of the particular type may be to transfer 2,000 packets in the given amount of time. In order to determine an amount of data operational work performed by the switch in the given amount of time in performance index units, the 1,000 packets transferred during the amount of time (actual data operational work performed) may be divided by the 2,000 packets benchmark (benchmark work of a theoretical or known switch to be performed during the amount of time) to determine the amount of normalized data operational work performed by the switch in performance index units. For example, the switch may have performed 0.5 performance index units of data operational work. In some embodiments, performance index units may be expressed as percentage points, for example the data operational work performed by the switch may be expressed as 50 performance index units of data operational work, wherein the performance index units are expressed in percentage points of benchmark work expected for the particular type of computing device. In some embodiments, other statistical techniques may be used to determine normalized amounts of data operational work in performance index units.

In some embodiments, a monitoring system may be configured to receive data indicating amounts of data operational work performed by computing devices during given periods of time and respective amounts of electrical power consumed by the computing devices and support systems that support the computing devices during the given period of time. In some embodiments, a monitoring system may be implemented on one or more of computing devices being monitored, on a separate computing device in a same facility as the computing devices being monitored, or on a computing device in a location remote from the computing devices being monitored. In some embodiments, power sensors may be included at various points in a power distribution system to measure power consumption of downstream components in the power distribution system and to provide data indicating amounts of power consumed by the downstream components to a monitoring system. In some embodiments, a monitoring system may be configured to receive power consumption data from a separate power monitoring system or building management system.

In some embodiments, a monitoring system may be configured to receive data indicating amounts of data operational work performed by computing devices directly from the respective computing devices being monitored or may be configured to receive data indicating amounts of data operational work performed by computing devices being monitored from a management system that manages multiple computing devices in a facility such as a data center. For example, in some embodiments, a monitoring system may monitor a router and may be configured to receive data from the router indicating a quantity of data transferred by the router during a given period of time or a number of packets processed by the router during a particular period of time. In another example, a monitoring system may monitor a router in a data center that includes a traffic management system, and the monitoring system may receive data indicating an amount of data transferred by the router or a number of packets processed by the router from the traffic management system. In some embodiments, a monitoring system may receive data indicating amounts of data operational work performed by computing devices or sets of computing devices in a given amount of time from other system that manage such data.

Figure 11:
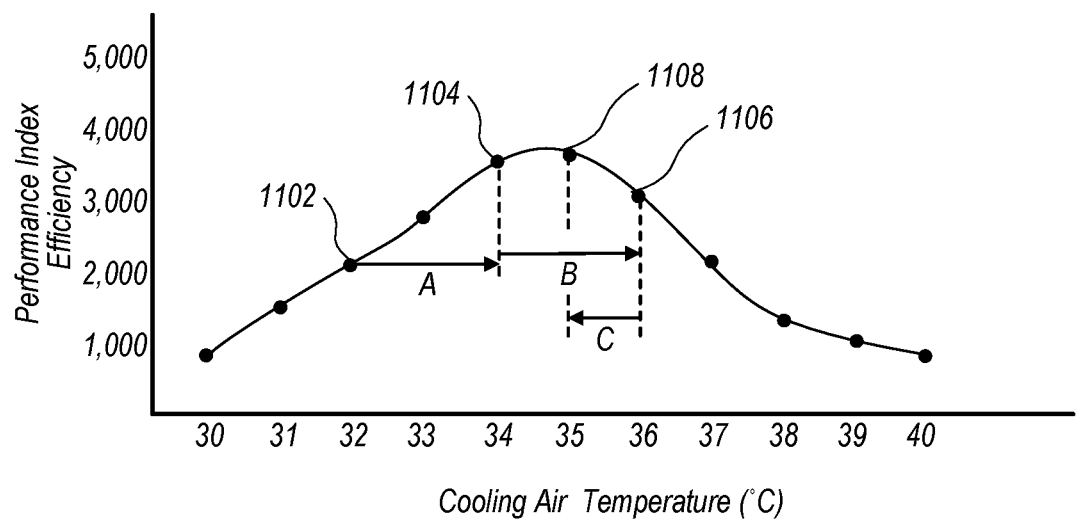
FIG. 11 is a graph illustrating a relationship between performance index efficiency and ambient air temperature in a computer room, according to some embodiments.

As discussed in more detail in regard to FIG. 11, a monitoring system may determine a performance index efficiency for a set of one or more computing devices based on received data indicating amounts of data operational work performed during given periods of time by a set of one or more computing devices being monitored and data indicating amounts of power consumed by the set of one or more computing devices being monitored and support systems that support the set of one or more computing devices being monitored during the given period of time.

In some embodiments, a monitoring system may be configured to store determined performance index efficiencies for respective periods of time in a depository. A monitoring system may also be configured to display real-time and historical performance index efficiencies. In some embodiments, a monitoring system may be configured to display performance index efficiencies at different granularities. For example, a monitoring system may be configured to determine and display performance index efficiencies for individual computing devices, sets of computing devices, such as a racks of computing devices or computer rooms of computing devices, or may be configured to determine and display performance index efficiencies for an overall facility, such as one or more data centers.

FIG. 1 is a schematic diagram illustrating a system which includes a data center and a performance efficiency monitoring system for monitoring efficiency of work done by components or portions of the data center, according to some embodiments.

System 150 includes data center 100 and monitoring system 132. Data center 100 includes compute devices 102, data transfer devices 104, data storage devices 106 and additional devices 108 in portion 110 of data center 100 and compute devices 112, data transfer devices 114, storage devices 116, and additional devices 118 in portion 120 of data center 100. In some embodiments, compute devices 102 and 112 may be servers configured to primarily perform compute operations. In some embodiments, data transfer devices 104 and 114 may be pieces of networking equipment configured to transmit data such as routers, switches, etc. Also, storage devices 106 and 116 may be servers configured to primarily perform storage operations. For example storage devices 106 and 116 may include several hard disk drives, solid state drives, or other suitable storage devices configured to store data. Additional devices 108 and 118 may be load balancer devices, firewall devices, or other types of devices that perform data operational work in a data center. In some embodiments, portions 110 and 120 may be computer rooms in a data center comprising multiple racks each comprising multiple rack mounted computing devices including compute servers, storage servers, switches, routers, firewalls, load balancers, etc. Data center 100 is illustrated with two portions, however ellipses are illustrated in FIG. 1 to indicate that a data center may include any number of portions or computer rooms.

Data center 100 also includes cooling systems 126, additional support systems 128, and management system 130. Cooling systems 126 provide cooling for data center 100 including providing cooling for compute devices 102 and 112, data transfer devices 104 and 114, storage devices 106 and 116, and additional devices 108 and 118. In some embodiments a data center may include separate cooling systems for separate portions of the data center or may include a common cooling system that provides cooling support to multiple portions of the data center. For example, cooling systems 126 may include separate cooling systems for respective ones of portions 110 and 120 or may include a cooling system that provides cooling to both portions 110 and 120. In some embodiments, a data center may include other support systems that support operation of computing devices in the data center. For example, additional support systems 128 may include lighting for portions 110 and 120 of data center 100, a security systems for data center 100, a building management system for data center 100, or other systems that support operation of data center 100.

In some embodiments, a data center, such as data center 100, may include a management system that manages and/or monitors work performed by computing devices in the data center. In some embodiments, computing devices in a data center, such as data center 100, may be part of a provider network and a management system, such as management system 130, may be part of the provider network and may manage and/or monitor work performed by computing devices in the data center. In some embodiments, a provider network may include multiple computing facilities that are part of a network that provides compute services, data storage services, data transfer services, or other services to customers of the provider network.

For example, a management system of a data center or a provider network, such as management system 130, may be configured to monitor compute work, such as processor utilization, floating point operations per second (FLOPS) or other measures of compute work performed by compute devices in a data center, such as compute devices 102 and 112.

In another example, a management system of a data center or a provider network, such as management system 130, may be configured to communicate with data transfer devices in a data center, such as data transfer devices 104 and 114, to determine amounts of data flowing through a data center network or in or out of a data center network. For example, data transfer devices 104 and 114 may be routers and management system 130 may be configured to request and/or receive traffic analysis data from the routers.

In another example, a management system of a data center or a provider network, such as management system 130, may be configured to communicate with storage devices in a data center and/or manage storage operations performed by storage devices in a data center. For example, storage devices 106 and 116 may be data storage servers and management system 130 may be configured to manage storage operations related to storage devices 106 and 116. In some embodiments, data storage devices, such as data storage devices 106 and 116, may be storage servers and may include multiple sets of data storages, such as hard drives or solid state drives. A data storage device that is a storage server that includes multiple data storages may enable all or portions of the data storages to perform data operations. In some embodiments, a management system, such as management system 130, may be configured to request and/or receive data from data storage devices, such as data storage devices 106 and 116, indicating a quantity of storages that are currently active for the storage server or indicating an amount of storage space that is currently active for the storage server. For example, a storage server may include multiple hard drives but may only power up a portion of the hard drives at a particular given time. The portion of the hard drives powered up may be available for use while other ones of the hard drives are not powered up and not available for use. A management system, such as management system 130, may receive data from storage devices, such as storage devices 106 and 116, indicating a currently available storage capacity. For example a management system, such as management system 130, may receive data indicating 100 gigabytes of storage space is currently active on a particular set of storage devices of storage device 106. Active storage space may include storage space that is currently storing data and storage space that is available to store data but not currently being used to store data. In some embodiments, in addition to or instead of currently available storage space data, a management system, such as management system 130, may be configured to receive data indicating a quantity of storage operations performed in a given amount of time by a particular storage device, such as a particular one of storage devices 106. For example, a management system, such as management system 130, may be configured to receive or generate data indicating a number of input/output operations performed per second (IOPS) for respective ones of storage devices 106 and 116 during a given period of time.

In some embodiments, a management system, such as management system 130, may manage compute work, data transfer work, and/or data storage work and may track compute work, data transfer work, or data storage work performed by computing devices in a data center or in a provider network without specifically requesting data from the computing devices indicating respective amounts of data operational work performed by the computing devices.

Data center 100 also includes power distribution system 122. Power distribution system 122 receives electrical power from power source 124 and distributes electrical power to computing devices and supports systems in data center 100. In some embodiments power source 124 may be a utility power source, a battery, a generator, or other suitable power source. In some embodiments a power distribution system may include transformers, uninterruptible power supplies, power distribution units, automatic transfer switches, power cabling, and other power distribution components. In addition, a power distribution system may include one or more power sensors located at different locations in the power distribution system. For example power distribution system 122 includes power sensors 140. Power sensors 140 may be configured to sense a quantity of power that flows through a particular portion of power distribution system 122 where a particular one of power sensors 140 is located. For example power sensor 136 may be configured to determine a quantity of electrical power that flows to computing devices in portion 110 of data center 100 during a given amount of time and power sensor 138 may be configured to determine a quantity of electrical power that flows to computing devices in portion 120 of data center 100 in a given amount of time.

In some embodiments, power sensors may measure current or power flow, and a quantity of power consumed during a given period of time may be determined by another system, such as monitoring system 132. In some embodiments, a monitoring system, such as monitoring system 132, may be configured to use multiple power measurements received from multiple power sensors to determine a quantity of electrical power consumed by a particular computing device, set of computing devices, or support system during a given period of time. For example, in some embodiments a data center, such as data center 100, may include fewer power sensors than illustrated in FIG. 1 and a monitoring system, such as monitoring system 132, may be configured to subtract power flows sensed in different portions of a power distribution system to determine a quantity of electrical power consumed by a particular computing device, set of computing devices, or support system in a given amount of time. In some embodiments, a power distribution system may include a power management system and/or a separate power monitoring system and a monitoring system, such as monitoring system 132, may receive data from the power management system or the separate power monitoring system indicating power consumption data for computing devices and support systems that receive electrical power from the power distribution system. In some embodiments, a monitoring system may be configured to apportion an amount of power consumed by a support system to determine an amount of the power consumed by the support system in support of a particular computing device or set of computing devices. For example, monitoring system 132 may receive power consumption data from cooling systems 126 and may be configured to determine what portion of the power consumed by the cooling systems 126 is related to cooling computing devices in portion 110 of data center 100 and what portion of the power consumed by cooling systems 126 is related to cooling computing devices in portion 120 of data center 100.

In some embodiments, a monitoring system, such as monitoring system 132, may be configured to synchronize power consumption data and operational work data such that amounts of power consumed during a given time period are synchronized with amounts of data operational work performed during the given period of time. In some embodiments, power sensors, such as power sensors 140, may be configured to report power consumption data at intervals that are synchronized with intervals at which a management system, such as management system 130, reports operational work data. In such embodiments, power consumption data and operational work data may be received at a monitoring system, such as monitoring system 132 already synchronized.

In some embodiments, a monitoring system, such as monitoring system 132, may be configured to normalize received amounts of data operational work performed during given amounts of time into amounts of data operational work measured on a common measurement scale such as performance index units. For example, a performance index unit may represent a percentage of a benchmark amount of work performed by a given type of computing device. For example, a known or theoretical switch may have a benchmark capacity of 100 gigabytes per second and a particular switch may transmit 75 gigabytes per second. A normalized amount of data transferred by the switch may be expressed as 75 performance index units because the switch transferred 75% of the benchmark amount of data transfer for that particular type of computing device in the given amount of time. In another example, a benchmark storage device may be able to make a 100 terabytes of data storage space available to store data and a particular data storage device may only make 10 terabytes of space available to store data during a given period of time. A normalized amount of available storage space may be expressed as 10 performance index units. Continuing the example, subsequently the storage device may activate additional hard drives and may make a total of 60 terabytes of space available to store data during another given period of time. A normalized amount of available storage space during the other given period of time may be expressed as 20 performance index units.

In some embodiments, a monitoring system, such as monitoring system 132, may be configured to use a normalized amount of data operational work expressed in performance index units to determine a performance index efficiency (also referred to herein as a performance efficiency) for a particular computing device, or set of computing devices. In order to determine a performance index efficiency for a particular computing device or set of computing devices, a monitoring system, such as monitoring system 132, may divide an amount of data operational work performed by the particular computing device or set of computing devices expressed in performance index units during a given period of time by an amount of electrical power consumed by the particular computing device or set of computing devices and an amount of electrical power consumed by support systems supporting the particular computing device or set of computing device during the given period of time. For example, monitoring system 132 may determine an amount of data operational work expressed in performance index units performed by compute devices 102, data transfer devices 104, storage devices 106, and additional devices 108 all of portion 110 during a particular period of time. Monitoring system 132 may also determine a quantity of electrical power consumed by compute devices 102, data transfer devices 104, storage devices 106, and additional devices 108 during the particular period of time and, in addition, determine a portion of electrical power consumed by cooling systems 126 and additional support systems 128 that support portion 110 of data center 100 during the particular period of time. After determining the data operational work for portion 110 and power consumed for portion 110 during the particular period of time, monitoring system 132 may determine a performance index efficiency for portion 110 by dividing the determined aggregate data operational work expressed in performance units performed in relation of portion 110 during the particular period of time by the aggregate power consumption related to portion 110 during the particular period of time.

In some embodiments, a monitoring system may include a depository for storing normalized amounts of data operational work, power consumption information, and performance index efficiencies. In some embodiments, a monitoring system, such as monitoring system 132, may include a display module configured to generate a user interface for displaying data such as performance index efficiencies. For example, monitoring system 132 is configured to generate interface 134 that indicates performance efficiencies for portion 110 and portion 120 of data center 100. In some embodiments, a data center may include any number of portions, and a monitoring system may be configured to generate for display an interface indicating performance efficiencies for respective portions of the data center. For example, interface 134 include an indication of a performance efficiency for portion "N" of data center 100, where N represents any number of portions that may be included in data center 100.

Figure 2:
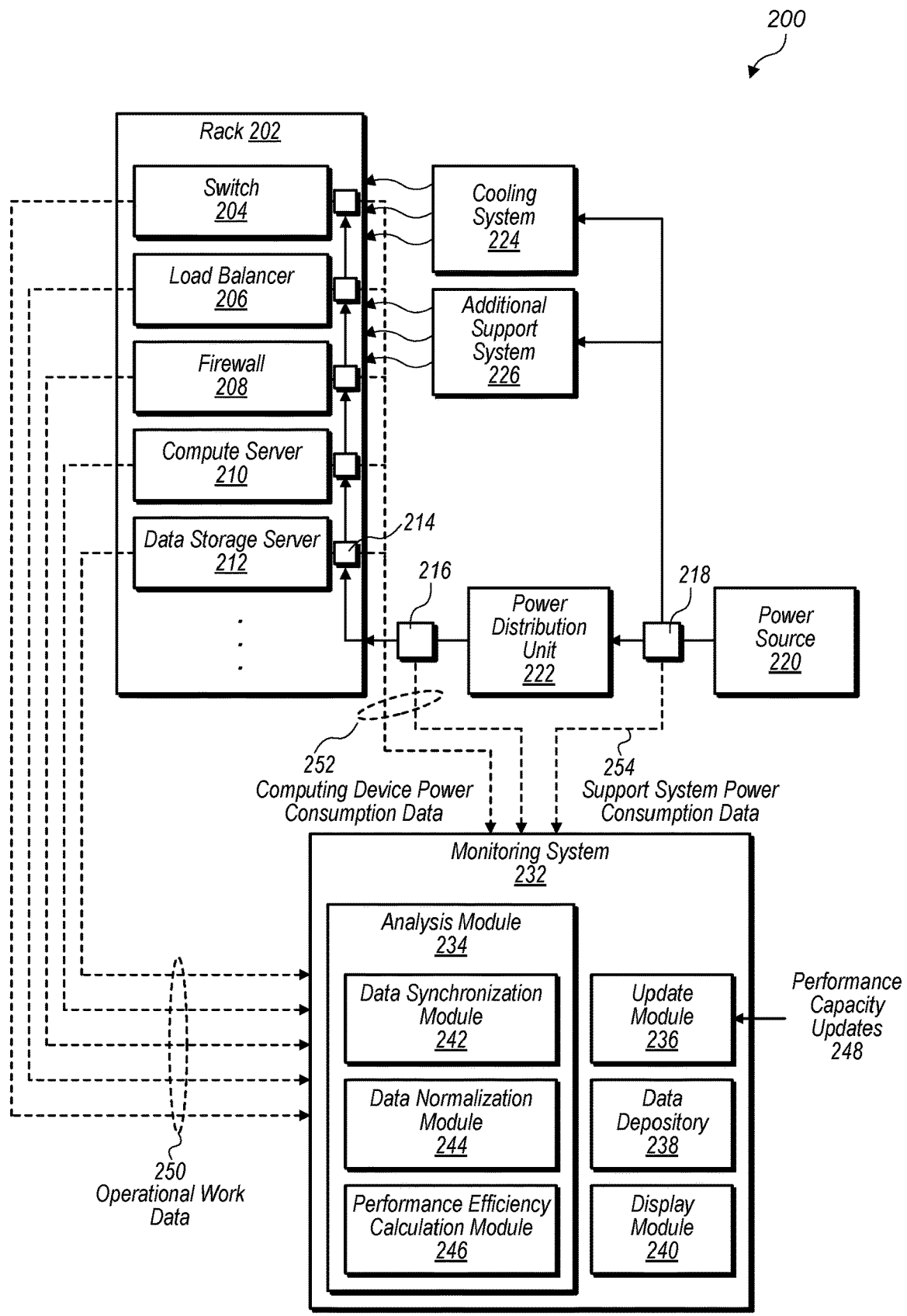
FIG. 2 is a schematic diagram illustrating a rack computer system and a performance efficiency monitoring system for monitoring efficiencies of computing devices mounted in the rack computer system, according to some embodiments.

FIG. 2 is a schematic diagram illustrating a rack computer system and a performance efficiency monitoring system for monitoring efficiencies of computing devices mounted in the rack computer system, according to some embodiments. System 200 includes rack 202 and monitoring system 232. Rack 202 includes switch 204, load balancer 206, firewall 208, compute server 210, and data storage server 212.

In some embodiments, a monitoring system, such as monitoring system 132 illustrated in FIG. 1, may receive data operational work from individual computing devices, such as illustrated in FIG. 2 in regard to monitoring system 232. In addition, in some embodiments, a monitoring system may monitor performance index efficiency at a rack level or computing device level. For example, monitoring system 232 monitors switch 204, load balancer 206, firewall 208, compute server 210, and data storage server 212 mounted in rack 202. In some embodiments, monitoring system 232 may be implemented on a compute server 210 in rack 202, may be implemented on a compute server in another rack in a data center that includes rack 202, or may be implemented on a computing device in a remote location, such as another data center connected to a provider network that is also connected to computing devices in rack 202. In some embodiments, a monitoring system may receive power consumption data from power sensors at a computing device level or a rack level. For example, monitoring system 232 may receive power consumption data from power sensors 214 that indicate amounts of power consumed by individual computing devices in rack 202 or may receive power consumption data from power sensor 216 that indicates an overall amount of power consumed by computing devices in rack 202. In addition, a monitoring system, such as monitoring system 232, may receive power consumption data from other power sensors in a power distribution system. For example monitoring system may receive power consumption information from power sensor 218 that is downstream of power source 220 but upstream of power distribution unit (PDU) 222 that distributes power to computing devices in rack 202 and upstream of cooling system 224 and additional support system 226. In some embodiments, monitoring system 232 may subtract power consumption at power sensor 216 from power consumption at power sensor 218 to determine an amount of power consumed by cooling system 224 and additional support system 226. In some embodiments, a monitoring system, such as monitoring system 232, may receive power consumption data from virtual sensors. For example, in some embodiments, power sensors 214 may be virtual sensors that deduce power consumption data based on other measured variables, such as processor utilization, etc.

In some embodiments, a monitoring system, such as monitoring system 232, may include an analysis module, such as analysis module 234, an update module, such as update module 236, a data depository, such as data depository 238, and a display module, such as display module 240. Monitoring system 132 illustrated in FIG. 1 may be the same as monitoring system 232 illustrated in FIG. 2 and may include any of the various modules included in monitoring system 232.

An analysis module may include a data synchronization module, such as data synchronization module 242, a data normalization module, such as data normalization module 244, and a performance index efficiency calculation module, such as performance efficiency calculation module 246. An analysis module of a monitoring system, such as analysis module 234 of monitoring system 232, may receive data indicating data operational work performed by computing devices being monitored by the monitoring system. For example analysis module 234 of monitoring system 232 may receive data operational work data 250 from switch 204, load balancer 206, firewall 208, compute server 210, and data storage server 212. An analysis module of a monitoring system may also receive power consumption data from power sensors in a power distribution system or from a power management or power monitoring system. For example, analysis module 234 of monitoring system 232 may receive computing device power consumption data from power sensors 214 and from power sensor 216. Analysis module 234 of monitoring system 232 may also receive overall power consumption data 254 from power sensor 218. A synchronization module, such as synchronization module 242, may subtract different amounts of power consumption sensed at different power sensors to determine amounts of power consumption that correspond with different computing devices and support system that support the computing devices. Also, a synchronization module, such as synchronization module 242, may synchronize power consumption amounts with amounts of data operational work such that time periods in which the power was consumed correspond to time period in which the data operational work was performed.

In some embodiments, data operational work 250 may indicate actual useful data operational work performed by computing devices mounted in rack 202 and may indicate the useful data operational work in various units. For example, work performed by switch 204 may be indicated in frames per second, whereas work performed by compute sever 210 may be indicated in FLOPS. In order to aggregate data operational work performed by the different computing devices included in rack 202, respective amounts of data operational work performed by the respective computing devices included in rack 202 may be normalized using a common measurement scale. For example, data operational work may be normalized into performance index units, where a performance index unit indicates a percentage of a benchmark amount of work performed during a given period of time for a particular type of computing device. For example, if the given period of time is a second and compute server 210 performs 70 FLOPS and a benchmark compute sever performs 100 FLOPS (note that a FLOP is a floating point operation per second), then the normalized data operational work performed by compute server 210 may be 70 performance index units. As another example, data storage sever 212 may make 10 gigabytes of storage available during the given period of time and a benchmark storage sever may make 50 gigabytes of storage available during the same given period time. Thus, the data operational work performed by data storage server 212 may be expressed as 20 performance index units. A data normalization module, such as data normalization module 244, may be configured to perform similar normalization calculations for data operational work performed by switch 204, load balancer 206, and firewall 208.

In some embodiments, an analysis module of a monitoring system, such as analysis module 234 of monitoring system 232, may include a performance index efficiency calculation module, such as performance efficiency calculation module 246. A performance index efficiency module may be configured to aggregate data operational work amounts expressed in performance index units for a set of computing devices and divide the aggregated data operational work expressed in performance index units by an amount of electrical power consumed by the set of computing devices and support systems that support the set of computing devices to determine a performance index efficiency for the set of computing devices. For example, performance efficiency calculation module 246 may aggregate amounts of data operational work expressed in performance index units performed by switch 204, load balancer 206, firewall 208, compute server 210, and data storage server 212 during a given period of time. Performance efficiency module 246 may also determine an amount of power consumed by switch 204, load balancer 206, firewall 208, compute server 210, data storage server 212, cooling system 224, and additional support system 226 during the given period of time. Performance efficiency calculation module 246 may also divide the determined aggregate data operational work by the determined total power consumption to determine a performance index efficiency for the computing devices of rack 202 as a set of computing devices. Monitoring system 232 may store the determined performance index efficiency in data depository 238 and may generate for display a user interface to display the determined performance index efficiency via display module 240.

In some embodiments, a monitoring system, such as monitoring system 232, may include an update module and may be configured to receive new or revised benchmark capacities via the update module. For example, a new model of compute servers may become available that have a greater capacity than a previous model of compute servers that were used as "benchmark" compute servers. Thus, a benchmark capacity for compute servers used by a monitoring system to normalize compute work may need to be updated. New capacity updates 248, for example indicating the new compute server capacity, may be submitted via update module 236. Subsequent to updating a benchmark capacity, a data normalization module, such as data normalization module 244, may update how the data normalization module performs normalization calculations such that data operational work done by compute severs is normalized using the updated benchmark capacity for compute servers.

In some embodiments, benchmark capacities may be actual known capacities for a particular type of computing device or may be theoretical maximum capacities. In some embodiments, benchmark capacities may be based on computing devices actually in use in a data center or in a provider network. In other embodiments, benchmark capacities may be based on computing devices that are available for purchase but not necessarily in use at a particular facility or within a particular provider network. In some embodiments, a monitoring system may be configured to perform modeling and forecasting related to performance index efficiency. For example, in some embodiments, a monitoring system may forecast or model performance index efficiencies if a particular model of computing device were implemented in a facility. Also, in some embodiments, a monitoring system may model power savings in comparison to capital costs to determine cost advantages of upgrading to computing devices that have capacities closer to a benchmark capacity for the particular type of computing device. In some embodiments, a monitoring system and performance index efficiencies determined by a monitoring system may be used to determine when to upgrade a computing device. For example, costs savings due to better efficiency of an upgraded computing device may be determined and compared against upgrade costs to determine when to upgrade a computing device.

Figure 3B:
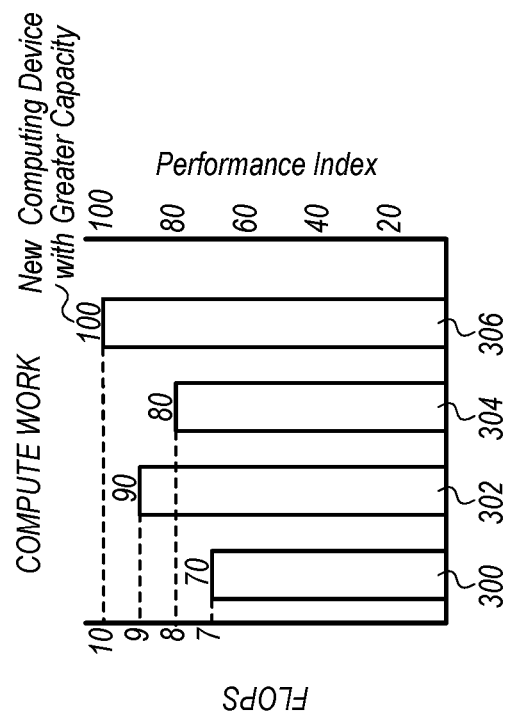
FIG. 3B is a graph illustrating computational work performed by computing devices according to a first measurement scale and an adjusted normalized measurement scale, according to some embodiments.
Figure 3A:
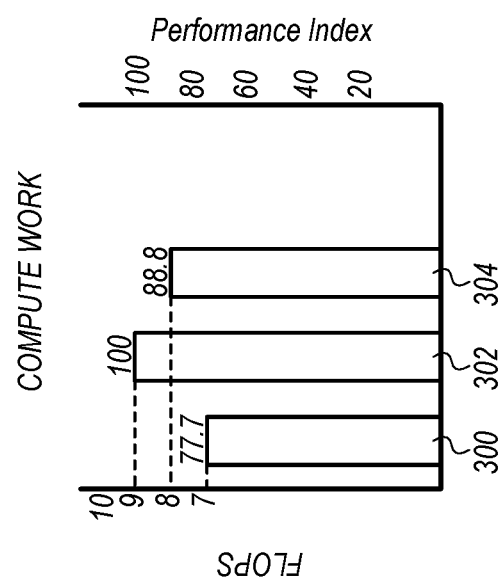
FIG. 3A is a graph illustrating computational work performed by computing devices according to a first measurement scale and a normalized measurement scale, according to some embodiments.

FIG. 3A is a graph illustrating computational work performed by computing devices according to a first measurement scale and a normalized measurement scale, according to some embodiments, and FIG. 3B is a graph illustrating computational work performed by computing devices according to a first measurement scale and an adjusted normalized measurement scale, according to some embodiments.

In FIG. 3A data operational work performed by computing devices 300, 302, and 304 is shown in a bar graph with data operational work measured in FLOPS on a first y-scale and normalized data operational work expressed in performance index units on a second y-scale. In FIG. 3A, computing device 302 performs 9 FLOPS, computing device 304 performs 8 FLOPS, and computing device 300 performs 7 FLOPS. In this particular example, computing device 302 is considered to be a benchmark capacity for computing devices of this type. Thus, the normalized data operational work expressed in performance units for compute device 302 is 100. This is because compute device 302 represents the benchmark capacity and is performing at benchmark capacity. Also, in this example, computing device 300 performs a normalized amount of data operational work expressed in performance index units of 77.7 (7 FLOPS/9 FLOPS (benchmark)*100=77.7). In addition, computing device 304 performs a normalized amount of data operational work expressed in performance index units of 88.8 (8 FLOPS/9 FLOPS (benchmark)*100=88.8).

In FIG. 3B, computing device 306 with a greater capacity is included in the normalization calculation. Computing device 306 is now considered the benchmark computing device. Thus, the benchmark FLOPS are now 10 instead of 9 as shown is FIG. 3A. In some embodiments, a new benchmark capacity of computing device 306 may be updated in a monitoring system, such as monitoring system 232, via a performance capacity update to an update module, such as update module 236. A data normalization module of a monitoring system, such as data normalization module 244 of monitoring system 232, may use the updated benchmark capacity, e.g. 10 FLOPS, to normalize data operational work performed by computing devices 300, 302, 304, and 306. In this example, computing device 300 may continue to perform 7 FLOPS, computing device 302 may continue to perform 9 FLOPS, and computing device 304 may continue to perform 8 FLOPS. However, since the benchmark capacity has been increased from 9 FLOPS to 10 FLOPS, normalized data operational work performed by computing devices 300, 302, and 304 may indicate less data operational work when normalized and expressed in performance index units than in FIG. 3A. For example, computing device 300 now performs 70 performance index units of work, compute device 302 now performs 90 performance index units of work, and compute device 304 now performs 80 performance index units of work. Because performance index units of work are based on a maximum capacity of a benchmark computing device, as higher capacity computing device become available existing computing devices appear to be less efficient. This consequence of expressing data operational work in performance index units helps a data center operator to understand an impact to efficiency of older equipment as newer higher capacity equipment becomes available. In FIGS. 3A-3B, FLOPS are used as an example unit of computational work, however in some embodiments, various other measurements of computational work could be used, such as processor utilization, etc.

Figure 4A:
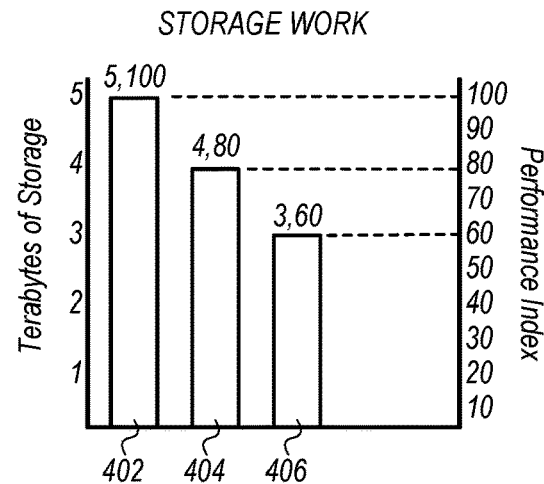
FIG. 4A is a graph illustrating data storage work performed by computing devices according to a first measurement scale and a normalized measurement scale, according to some embodiments.
Figure 4B:
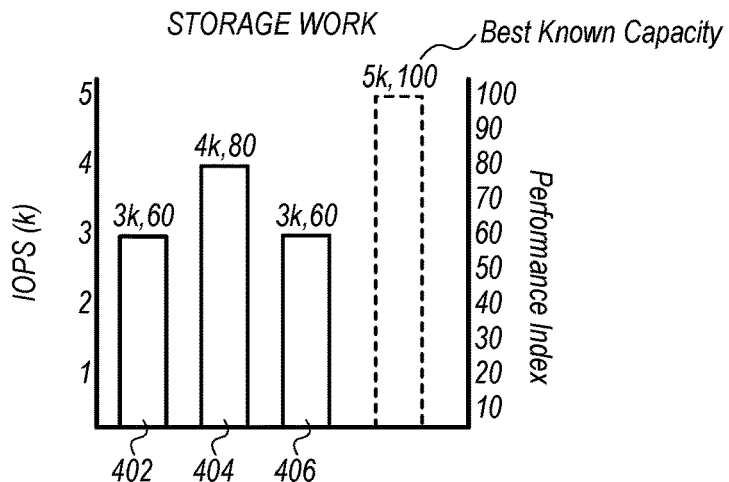
FIG. 4B is a graph illustrating data storage work performed by computing devices according to a second measurement scale and a second normalized measurement scale, according to some embodiments.
Figure 4C:
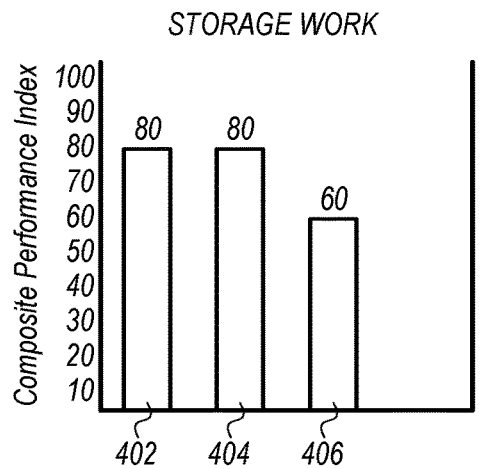
FIG. 4C is a graph illustrating data storage work performed by computing devices according to a composite normalized measurement scale, according to some embodiments.

FIGS. 4A-4C are respective graphs illustrating data storage work performed by computing devices according to a first measurement scale and a normalized measurement scale, illustrating data storage work performed by computing devices according to a second measurement scale and a second normalized measurement scale, and illustrating data storage work performed by computing devices according to a composite normalized measurement scale, according to some embodiments.

FIG. 4A illustrates data operational work performed by data storage devices 402, 404, and 406 during a given period of time expressed in terabytes of storage space made available during the given period of time and also expressed in normalized performance index units. Data operational work performed by data storage devices 402, 404, and 406 may be normalized in a similar manner as described above in regards to FIGS. 1-3. In this example, data storage device makes 5 terabytes of storage space available and performs 100 performance index units of data operational work. Note that storage device 402 is considered the benchmark capacity storage device for the normalization of data operational work performed by storage devices 402, 404, and 406. Storage device 404 makes 4 terabytes of storage available and performs 80 performance index units of data operational work. Storage device 406 makes 3 terabytes of storage space available and performs 60 performance index units of data operational work.

In some embodiments, data operational work performed by storage devices may be expressed in terms of IOPS instead of or in addition to a quantity of storage space made available during a given period of time. In the example illustrated in FIG. 4B, the best known capacity or benchmark capacity for storage devices is 5,000 IOPS. Storage device 402, performs 3,000 IOPS and performs 60 performance index units of data operational work. Storage device 404 performs 4,000 IOPS and performs 80 performance index units of data operational work. Storage device 406 performs 3,000 IOPS and performs 60 performance index units of data operational work. In some embodiments, a best known capacity or benchmark capacity for a particular type of computing devices, such as storage devices, may be based on computing devices that are available for purchase or that could be built, but that are not actually included in a set of computing devices being monitored. For example, benchmark 408 (5,000 IOPS) may be a capacity of a storage device that is not included in a set of computing devices being monitored by a monitoring system, but is instead a benchmark capacity of a known or theoretical storage device that is loaded into a monitoring system as a benchmark capacity for storage devices.

In some embodiments, data operational work performed by a storage device may be expressed in composite performance index units that takes into account both an amount of storage space made available during a given period of time and an amount of IOPS performed during the given period of time. For example, storage device 402 performs 80 composite performance index units of data operational work (100+60/2), storage device 404 performs 80 composite performance index units of data operational work (80+80/2), and storage device 406 performs 60 composite performance index units of data operational work (60+60/2).

In, FIGS. 4A-4C, terabytes and IOPS are given as example measurements of data operational work performed by a storage device during a given period of time. In some embodiments, various other measurements of work performed by a storage device may be used.

Figure 5:
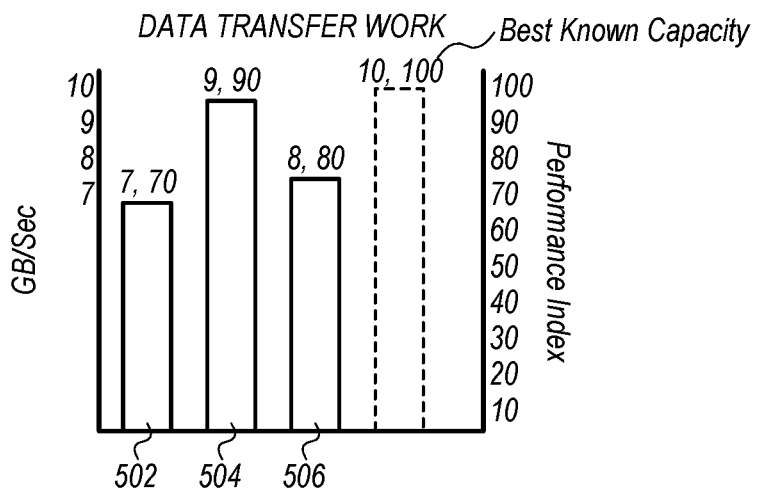
FIG. 5 is a graph illustrating data transfer work performed by computing devices according to a first measurement scale and a normalized measurement scale, according to some embodiments.

FIG. 5 is a graph illustrating data transfer work performed by computing devices according to a first measurement scale and a normalized measurement scale, according to some embodiments. Data transfer device 502 transfers 7 gigabytes of data per second, data transfer device 504 transfers 9 gigabytes of data per second, and data transfer device 506 transfers 8 gigabytes of data per second. Data operational work performed by data transfer devices, such as data transfer devices 502, 504, and 506 may be normalized in a similar manner as described in FIGS. 1-4. In this example, a benchmark capacity for data transfer devices may be 10 gigabytes per second. Thus, normalized amounts of data operational work performed by data transfer devices 502, 504, and 506 may be 70 performance index units of data operational work performed by data transfer device 502, 90 performance index units of data operational work performed by data transfer device 504, and 80 performance index units of data operational work performed by data transfer device 506.

In some embodiments, data operational work performed by other types of computing devices such as firewalls, load balancers, or various other types of computing devices may be included in a performance index efficiency calculation by a monitoring system.

Figure 6:
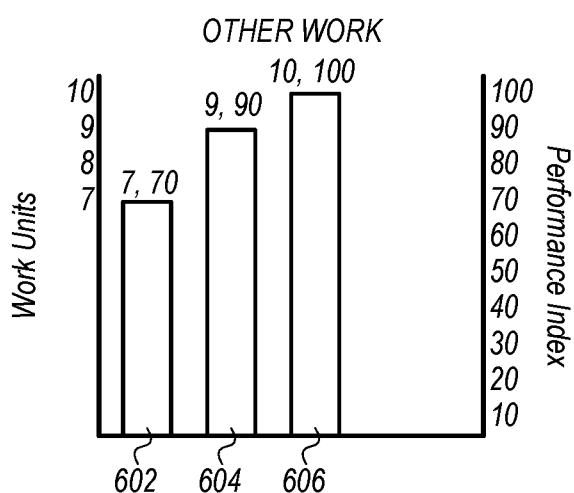
FIG. 6 is a graph illustrating other types of data operational work performed by computing devices according to a first measurement scale and a normalized measurement scale, according to some embodiments.

FIG. 6 is a graph illustrating other types of data operational work performed by computing devices according to a first measurement scale and a normalized measurement scale, according to some embodiments. Data operational work performed by other types of computing devices expressed in other units of measure may be normalized into performance index units in a similar manner as described in FIGS. 1-5. For example, data operational work performed by additional devices 602, 604, and 606 may be normalized from a first measurement scale to a common measurement scale, wherein the common measurement scale is expressed in performance index units, which is a measurement based on a percentage of a benchmark amount of work performed by a computing device of a particular type in a given amount of time.

In some embodiments, a computing device may be a hybrid computing device configured to perform more than one type of data operational work. For example, a computing device may be configured to perform both computational data operational work and storage data operational work. In some embodiments, data indicating data operational work performed by a computing device may indicate more than one type of data operational work performed by the computing device in a given amount of time. For example data indicating an amount of data operational work performed by a computing device during a given period of time may indicate a certain amount of computational work indicated in units of computational data operational work, e.g. FLOPS, and may indicate an amount of storage work in units of storage data operational work, e.g. gigabytes of storage space made available during the given period of time. In some embodiments, a monitoring system may be configured to receive data from a hybrid computing device indicating multiple types of data operational work performed by the hybrid computing device and normalize the amounts of data operational work into performance index units. The amounts of data operational work expressed in performance index units may then be aggregated for a set of computing devices that includes the hybrid computing device, and a performance index efficiency may be determined for the set of computing devices that includes the hybrid computing device.

Figure 7:
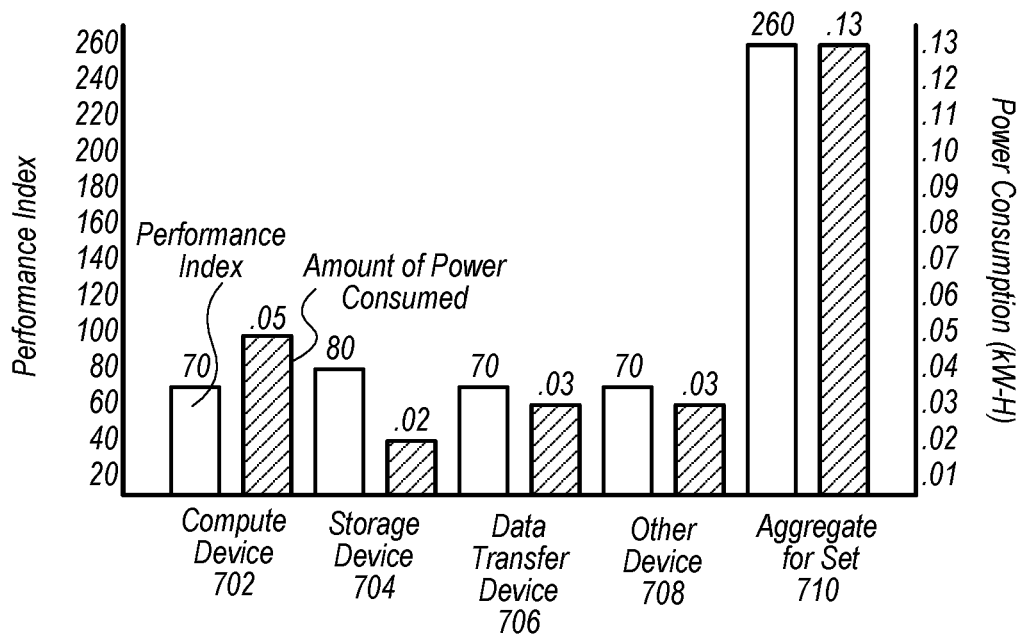
FIG. 7 is a graph illustrating performance indexes for different types of computing devices and respective amounts of power consumed by the different types of computing devices, according to some embodiments.

FIG. 7 is a graph illustrating performance indexes for different types of computing devices and respective amounts of power consumed by the different types of computing devices, according to some embodiments. Compute device 702 may be compute device 300 from FIG. 3B, storage device 704 may be storage device 402 from FIG. 4C, data transfer device 706 may be data transfer device 502 from FIG. 5, and other device 708 may be other device 602 from FIG. 6. Compute device 702, storage device 704, data transfer device 706, and other device 708 may constitute a set of computing devices, such as in a rack or a computer room. In some embodiments, a monitoring system may be configured to determine a performance index efficiency for each of compute device 702, storage device 704, data transfer device 706, and other device 708, and for a set that includes these computing devices. As discussed in regard to FIG. 2, a synchronization module of a monitoring system may determine an amount of electrical power consumed by a particular computing device and support systems that support the particular computing device during a given period of time. Also, a synchronization module may determine an amount of electrical power consumed by a set of computing devices during a given period of time. For example, FIG. 7 includes respective amounts of electrical power consumed by respective ones of compute device 702, storage device 704, data transfer device 706, and other device 708, and consumed by the set of computing devices during a given period of time.

In some embodiments, a monitoring system may be configured to include any number of computing devices or groupings of computing devices in a set of computing devices for which a performance index efficiency calculation is to be performed. For example, a set of computing devices for which a performance index efficiency calculation is to be performed may include a single computing device, multiple computing devices of the same type, e.g. multiple compute servers, storage servers, data transfer devices, etc. Also, a set of computing devices for which a performance index efficiency calculation is to be performed may include computing devices of different types, such as a rack of computing devices including different types of computing devices, a compute room including multiple racks, a data center including multiple compute rooms, or a network including multiple data centers. In some embodiments a set of computing devices for which a performance index efficiency calculation is to be performed may include any number of computing devices and any combination of types of computing devices.

A monitoring system may divide an amount of data operational work performed in performance index units during a given period of time by an amount of electrical power consumed during the given period of time to determine a performance index efficiency.

Figure 8:
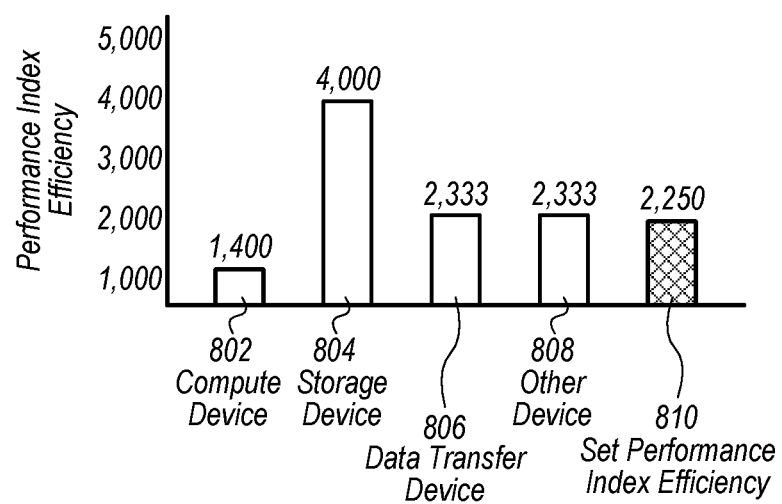
FIG. 8 is a graph illustrating performance index efficiencies for different types of computing devices, according to some embodiments.

FIG. 8 is a graph illustrating performance index efficiencies for different types of computing devices, according to some embodiments. Compute device 802 may be the same as compute device 702 and have a performance index efficiency (PIE) of 1,400, storage device 804 may be the same as storage device 704 and have a PIE of 4,000, data transfer device 806 may be the same as data transfer device 706 and have a PIE of 2,333, other device 808 may be the same as other device 708 and may have a PIE of 2,333. Set 810 may be the same as set 710 and may have a PIE of 2,250. Note that in each case the performance index values in FIG. 7 have been divided by the power consumption values in FIG. 7 to determine the PIE's in FIG. 8. In some embodiments, power consumption during the given period of time may be expressed in other units besides kilowatt-hours. In such cases, PIE values may be less or more based on the units used for power consumption.

In some embodiments, a monitoring system may be configured to store performance index efficiencies (PIE)s and a display module of a monitoring system may be configured to display or provide historical PIE measurements.

Figure 9:
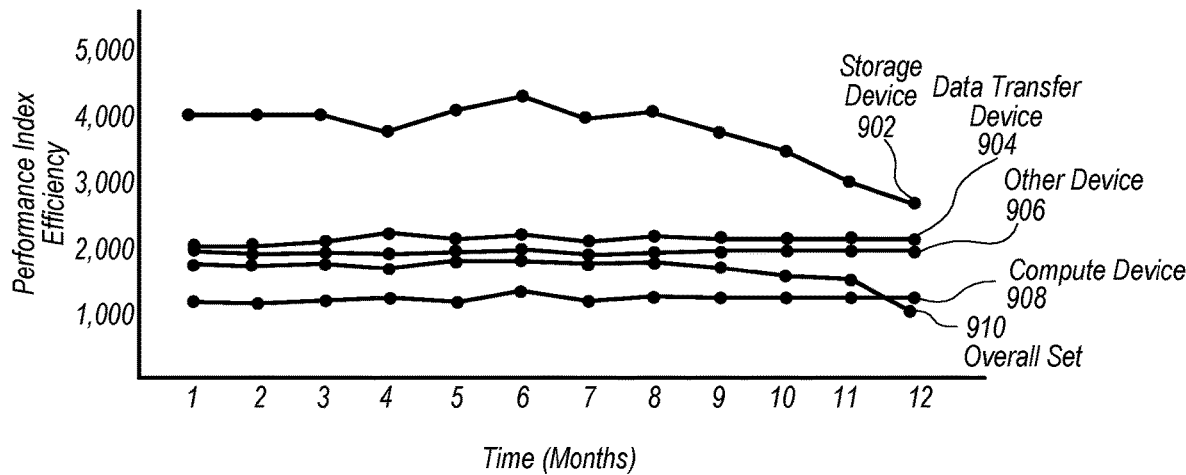
FIG. 9 is a graph illustrating a performance index efficiency history for a portion of a set of computing devices, according to some embodiments.

FIG. 9 is a graph illustrating a performance index efficiency history for a portion of a set of computing devices, according to some embodiments. FIG. 9 illustrates a performance index efficiency history for storage device 902, data transfer device 904, other device 906, compute device 908, and set 910. The performance index efficiency histories may be stored in a data storage depository of a monitoring system and may be generated for display via a display module of a monitoring system, such as any of the monitoring systems described in FIGS. 1-8.

In some embodiments, a display module of a monitoring system may be configured to display performance index efficiencies for various groupings of computing devices, racks, computer rooms, data centers, or portions of a network.

Figure 10:
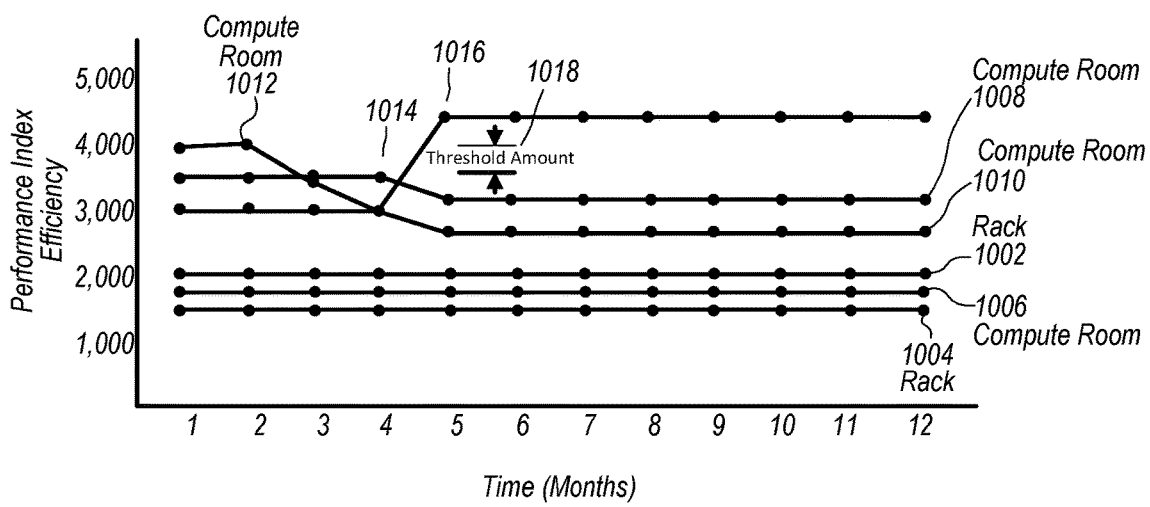
FIG. 10 is a graph illustrating a performance index efficiency history for racks and computer rooms of one or more data centers, according to some embodiments.

FIG. 10 is a graph illustrating a performance index efficiency history for racks and computer rooms of one or more data centers, according to some embodiments. FIG. 10 illustrates a performance index history for compute room 1008, compute room 1010, compute room 1012, rack 1002, compute room 1006, and rack 1004. The performance index histories illustrated in FIG. 10 may be stored in a data storage depository of a monitoring system and may be generated for display via a display module of a monitoring system, such as any of the monitoring systems described in FIGS. 1-9.

In some embodiments, a monitoring system may include an alarm module configured to indicate an alarm based on PIE measurements. For example, a monitoring system may be configured to generate a deviation alarm if PIE measurements for similarly situated computing devices or sets of computing devices deviate from each other more than a threshold amount. For example, at 1014 respective PIEs for compute room 1012, compute room 1008, and compute room 1010 deviate more than a threshold amount 1018. In response to determining the respective PIEs deviate more than the threshold amount, an alarm may be indicated. In response to the alarm an issue associated with compute room 1012 may be resolved, and at 1016 a PIE for compute room 1012 may improve based on the corrective action taken in response to the deviation alarm. For example, an issue in a compute room may include a malfunctioning computing device, a malfunctioning piece of support equipment, etc. and a corrective action may include repairing or replacing a malfunctioning computing device or a malfunctioning piece of support equipment. For example, a fan in a compute server may malfunction such that the fan runs continuously (even when not needed for cooling), this may cause a performance index efficiency for the compute server to deviate from a performance index efficiency of one or more similarly situated compute servers. The PIE of the compute server may deviate from the PIEs of the similarly situated compute servers more than a threshold amount, and in response to the deviation, a monitoring system may issue an alarm or alert indicating the deviation. In response to the alarm or alert, a technician at a facility in which the compute server is located may investigate the cause of the deviation alarm and determine that the fan in the compute servers is malfunctioning. The technician may then replace the fan or replace the compute server as a corrective action.

In another example, a deviation alarm may be triggered due to a performance index efficiency of a particular computing device or set of computing devices deviating from similarly situated computing devices or sets of computing devices due to the particular computing device or set of computing devices being a model or design of computing device that is less efficient than other computing devices without the particular computing device or set of computing device malfunctioning. For example, a monitoring system may monitor multiple racks of computing devices in a facility. Several racks at the facility may be upgraded to include newer more efficient computing devices, however at least some of the racks at the facility may not initially be upgraded. If a difference in PIE between the upgraded racks and the non-upgraded racks exceeds a threshold amount, a monitoring system may cause an alarm or alert to be issued indicating the difference in PIE between the upgraded racks and the non-upgraded racks. In response to the alarm or alert, the non-upgraded racks may be evaluated for upgrade and costs associated with less than efficient operations may be balanced against upgrade costs to determine if and when the non-upgraded racks should be upgraded.

In some embodiments, upgrading one or more computing devices in a compute room, such as compute room 1012, may include installing new computing devices with benchmark capacities that set a new benchmark capacity used by a monitoring system for normalizing data operational work performed by computing devices of a particular type corresponding to the new computing device. For example, at 1016, a benchmark capacity stored in a monitoring system may be updated due to newly installed computing devices in compute room 1012. This may cause the PIE of compute rooms 1008 and 1010 to fall due to the increased benchmark capacity. In some embodiments, a monitoring system may indicate an additional alert or alarm due to a deviation in PIE between sets of similarly situated computing devices due to a change in PIE resulting from an upgraded benchmark capacity. For example, an additional alert may be indicated subsequent to 1016 indicating that compute room 1012 (with a higher PIE due to newly installed computing devices) deviates from compute room 1010 by more than a threshold amount.

In some embodiments, a monitoring system, such as any of the monitoring systems described in FIGS. 1-10, may be configured to further receive data indicating ambient air temperatures of cooling air being supplied to computing devices to cool the computing devices. In such embodiments, the monitoring system may be configured to determine a relationship between ambient air temperature of cooling air supplied to cool a computing device or set of computing devices and performance efficiencies of computing devices or sets of computing device being cooled by the cooling air. The relationship may indicate a maximum efficiency temperature for cooling air that cools the computing device or set of computing devices. For example, in some circumstances raising an ambient temperature of cooling air used to cool a computing device or set of computing devices may increase performance efficiency by reducing an amount of power consumed by support systems, such as a cooling system that cools the air. However, above a certain temperature, efficiency gains from reducing power consumption by support systems may be exceed by additional power consumption by computing devices operating at elevated temperatures. For example, internal fans of computing devices may consume more electrical power when operating at elevated temperatures than an amount of power saved by operating support systems, such as cooling systems, at higher temperatures. In some embodiments, a monitoring system may be configured to issue an alarm or alert if a cooling air temperature of cooling air being supplied to a computing device or set of computing devices is higher or lower than a maximum efficiency temperature by more than a threshold amount.

In some embodiments, a monitoring system, such as monitoring systems 132 or 232, may coordinate with a control system of a cooling system, such as a control system of cooling system 126 or cooling system 224. The monitoring system may provide feedback to the cooling control system such that the cooling control system controls ambient air provided to cool a set of computing devices at or near a maximum efficiency temperature.

FIG. 11 is a graph illustrating a relationship between performance index efficiency and ambient air temperature in a computer room, according to some embodiments.

In some embodiments, a monitoring system, such as any of the monitoring systems described in FIGS. 1-10, may coordinate with a cooling system to control or cause the cooling system to control an ambient temperature of air being provided to cool a set of computing devices to be at or near a maximum efficiency temperature. For example, an ambient temperature of air being supplied to cool a set of computing devices may initially be at temperature 1102. A monitoring system may coordinate with a control system of a cooling system to increase the ambient temperature of air being supplied to cool the set of computing devices to temperature 1104 (change "A"). The monitoring system may then coordinate with a control system of a cooling system to increase the ambient temperature of air being supplied to cool the set of computing devices to temperature 1106 (change "B"). The monitoring system may determine that the performance index efficiency at temperature 1106 is less than the performance index efficiency at temperature 1104 and determine that a maximum efficiency temperature has been exceeded. In response, the monitoring system may coordinate with a control system of a cooling system to decrease the ambient temperature of air being supplied to cool the set of computing devices to temperature 1108 (change "C"). The monitoring system may determine that a performance index efficiency associated with temperature 1108 is greater than a performance index efficiency associated with temperature 1102, 1104, and 1106. The monitoring system may then coordinate with a control system of a cooling system to maintain the ambient temperature of air being supplied to cool the set of computing devices at temperature 1108. In some embodiments various other algorithms or methods may be used to determine a maximum efficiency temperature and to control a cooling system to operate at or near a maximum efficiency temperature. In some embodiments, a maximum efficiency temperature may be determined by manually adjusting a control system of a cooling system.

Figure 12:
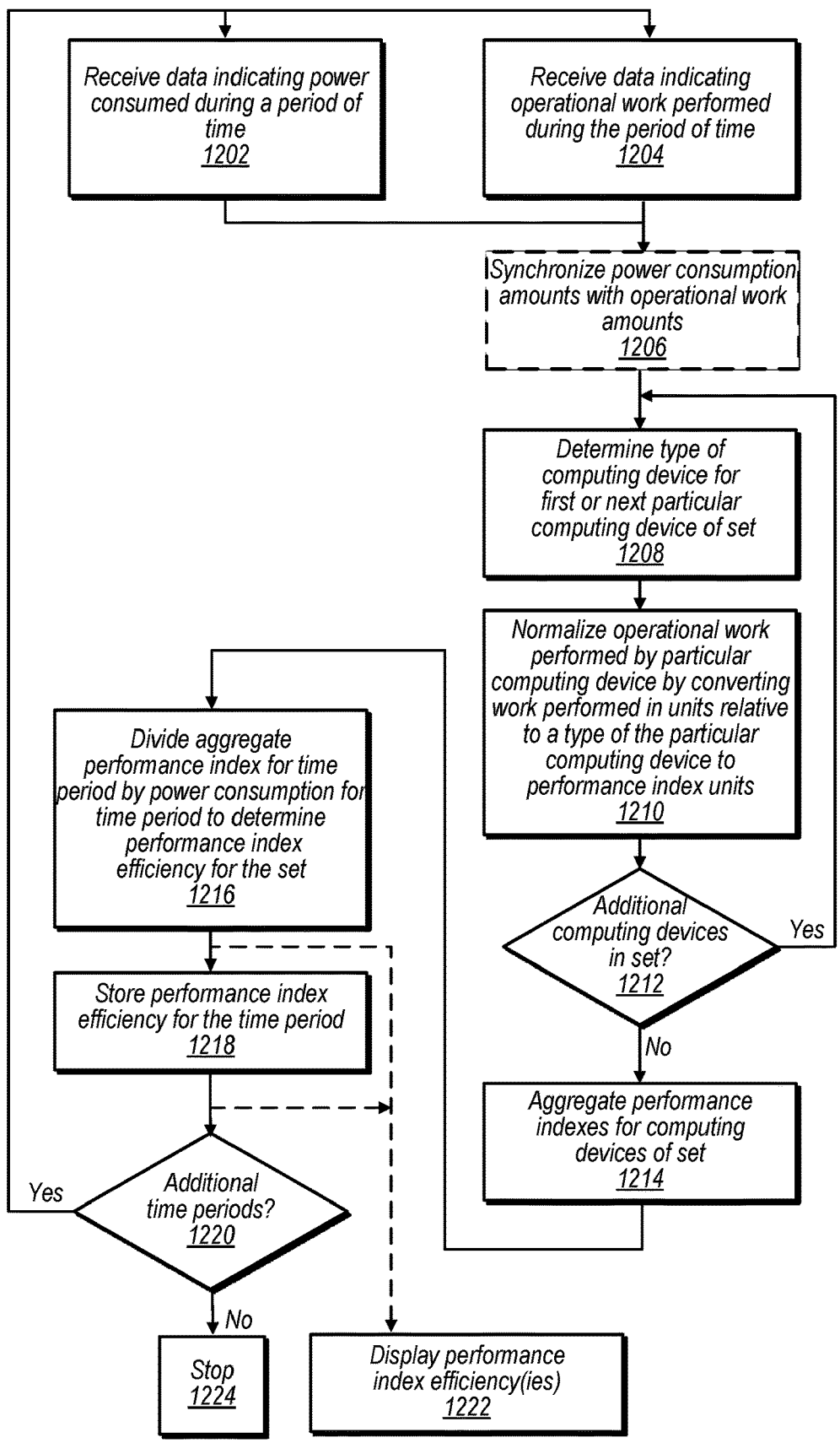
FIG. 12 illustrates determining a performance index efficiency for a set of computing devices, according to some embodiments.

FIG. 12 illustrates determining a performance index efficiency for a set of computing devices, according to some embodiments.

At 1202 data indicating power consumed during a period of time is received. The data may indicate power consumed by computing devices and support systems that support the computing devices.

At 1204 data indicating data operational work performed during the period of time is received. In some embodiments, data indicating data operational work may be received from a management system or may be received directly from computing devices that perform the data operational work. In some embodiments, data indicating amounts of data operational work may be received from other intermediary devices or systems.

At 1206 data operational work data and power consumption data are synchronized for a set of computing devices for which power index efficiency is to be calculated. In some embodiments, data operational work data and power consumption data may be received by a monitoring system already synchronized and step 1206 may be omitted.

At 1208, a type of computing device is determined for amounts of data operational work indicated as performed by a first computing device of a set of computing devices for which a performance index efficiency calculation is to be performed. Based on the determined type of computing device for the first computing device, at 1210 the amounts of data operational work indicated in the data operational work data for the first computing device of the particular type may be normalized using a benchmark capacity for the particular type of computing device. The normalized amounts of data operational work performed by the first computing device of the particular type of computing device may be expressed in performance index units.

At 1212 it is determined if there are additional computing devices in the set of computing devices for which the performance index calculation is to be performed. If there are additional computing devices in the set, then a type of a next computing device is determined for another computing device in the set at 1208 and amounts of data operational work performed by the other computing device is normalized at 1210. If there are not additional computing devices in the set for which the performance index calculation is to be determined, then at 1214 respective normalized amounts of data operational work performed by the respective computing devices of the set during a given period of time are aggregated to determine an overall amount of data operational work performed by the set of computing devices during the given amount of time, wherein the overall amount of data operational work is expressed in performance index units.

At 1216, the aggregate normalized amount of data operational work determined at 1214 is divided by an amount of power consumed by the set of computing devices and support systems that support the set of computing devices during the given period of time to determine a performance index efficiency (PIE) for the set of computing devices for the given period of time.

At 1218, the determined performance index efficiency for the set of computing devices for the given period of time may be stored in a data depository. In addition, at 1222 the determined PIE for the set of computing devices for the given period of time may be displayed via a user interface generated by a display module of a monitoring system. In some embodiments, performance index efficiencies may be displayed in real time or may be stored and subsequently displayed.

At 1220 it is determined if a performance index calculation is to be performed for a next period of time. If there are not additional periods of time for which performance index calculations are to be performed, the process may stop at 1224. However, if there are additional periods of time for which performance index calculations are to be performed, the process may repeat by reverting to 1202 and 1204. In some embodiments, data received at 1202 and 1204 may include data for multiple periods of time and the process may repeat by reverting to 1206 or 1208.

Figure 13:
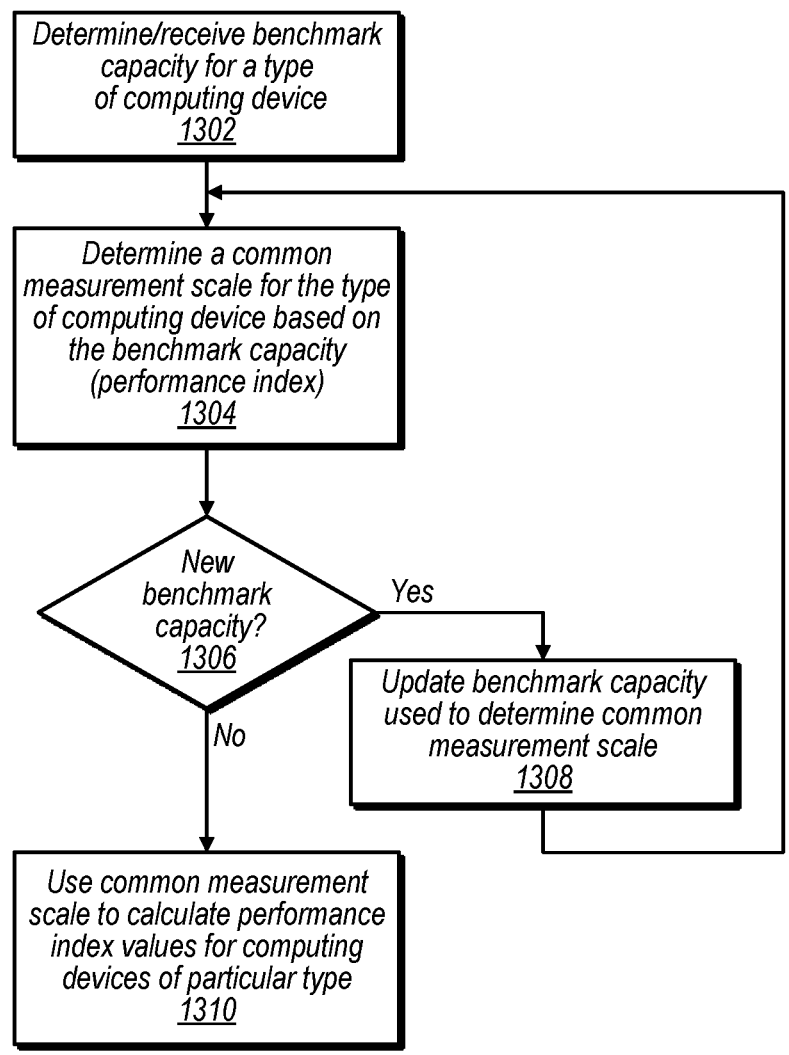
FIG. 13 illustrates adjusting a common measurement scale used to normalize data operational work measurements for a particular type of computing device, according to some embodiments.

FIG. 13 illustrates adjusting a common measurement scale used to normalize data operational work measurements for a particular type of computing device, according to some embodiments.

At 1302 a benchmark capacity for a particular type of computing device is determined or received by a monitoring system. In some embodiments, a monitoring system may track a highest capacity performance observed by computing devices of particular types to determine a benchmark capacity or may receive data indicating a benchmark capacity for a particular type of computing device.

At 1304 a common measurement scale is determined for a particular type of computing device based on the benchmark capacity received or determined at 1302. For example, a benchmark capacity may be received that indicates a capacity for a particular type of computing device to be 2000 units in a unit system specific to the particular type of computing device. At 1304 it may be determined that 20 units in the specific unit system for the particular type of computing device are equal to 1 performance index unit (2,000/100=20).

At 1306, it is determined if there is a new benchmark capacity. If there is a new benchmark capacity, at 1308 the benchmark capacity is updated and the common measurement scale is updated at 1304 using the updated benchmark capacity. If there is not a new benchmark capacity, at 1310 the common measurement scale is used to normalize amounts of data operational work expressed in units specific to the particular type of computing device, such that the normalized amounts of data operational work are expressed in performance index units.

Figure 14:
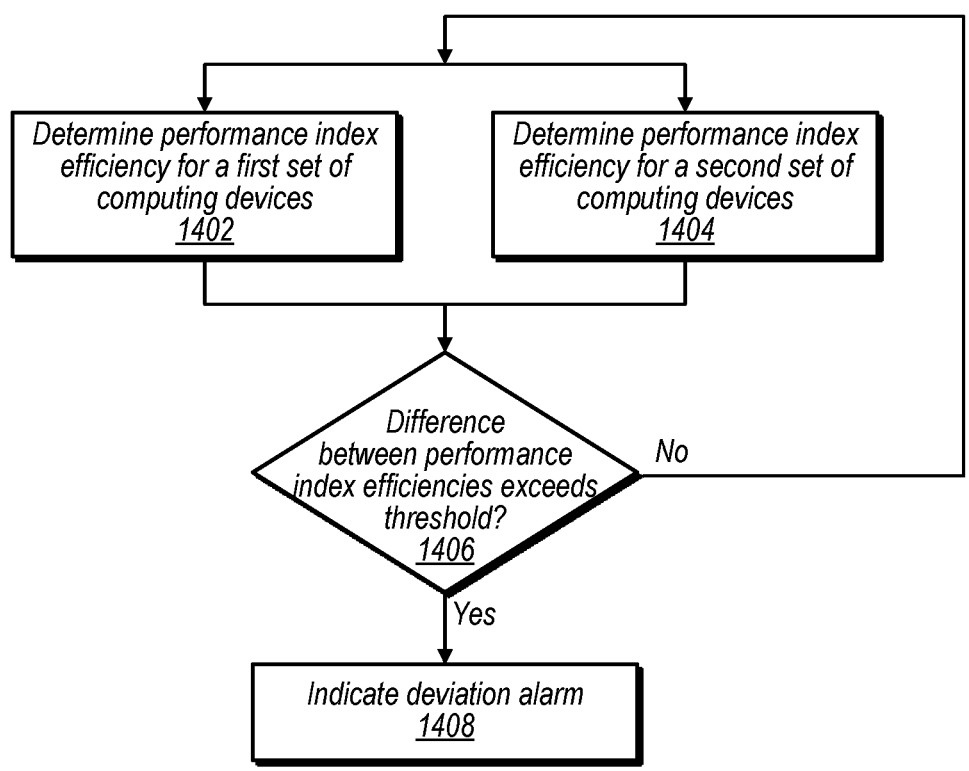
FIG. 14 illustrates monitoring multiple sets of computing devices and determining deviations in performance index efficiencies between the sets of computing devices, according to some embodiments.

FIG. 14 illustrates monitoring multiple sets of computing devices and determining deviations in performance index efficiencies between the sets of computing devices, according to some embodiments.

At 1402 and 1404 one or more performance index efficiencies are determined for one or more sets of computing devices. At 1406, it is determined if a difference between performance index efficiencies for two of the sets of computing devices exceed a threshold amount. At 1408, in response to performance index efficiencies deviating more than the threshold amount a deviation alarm is indicated. For example, two computer rooms may be similarly situated and may be expected to have similar performance index efficiencies. If performance index efficiencies of the computer rooms deviate more than a threshold amount, this may indicate a problem condition in one of the computer rooms. A deviation alarm may alert data center personnel to the problem condition so that it may be resolved and the efficiencies of the computer rooms improved.

In some embodiments, a monitoring system may compare a performance index efficiency of a computing device or set of computing devices to a pre-determined performance index efficiency and indicate an alarm if the performance index efficiency of the computing device or set of computing devices falls more than a threshold amount below the pre-determined performance index efficiency.

Figure 15:
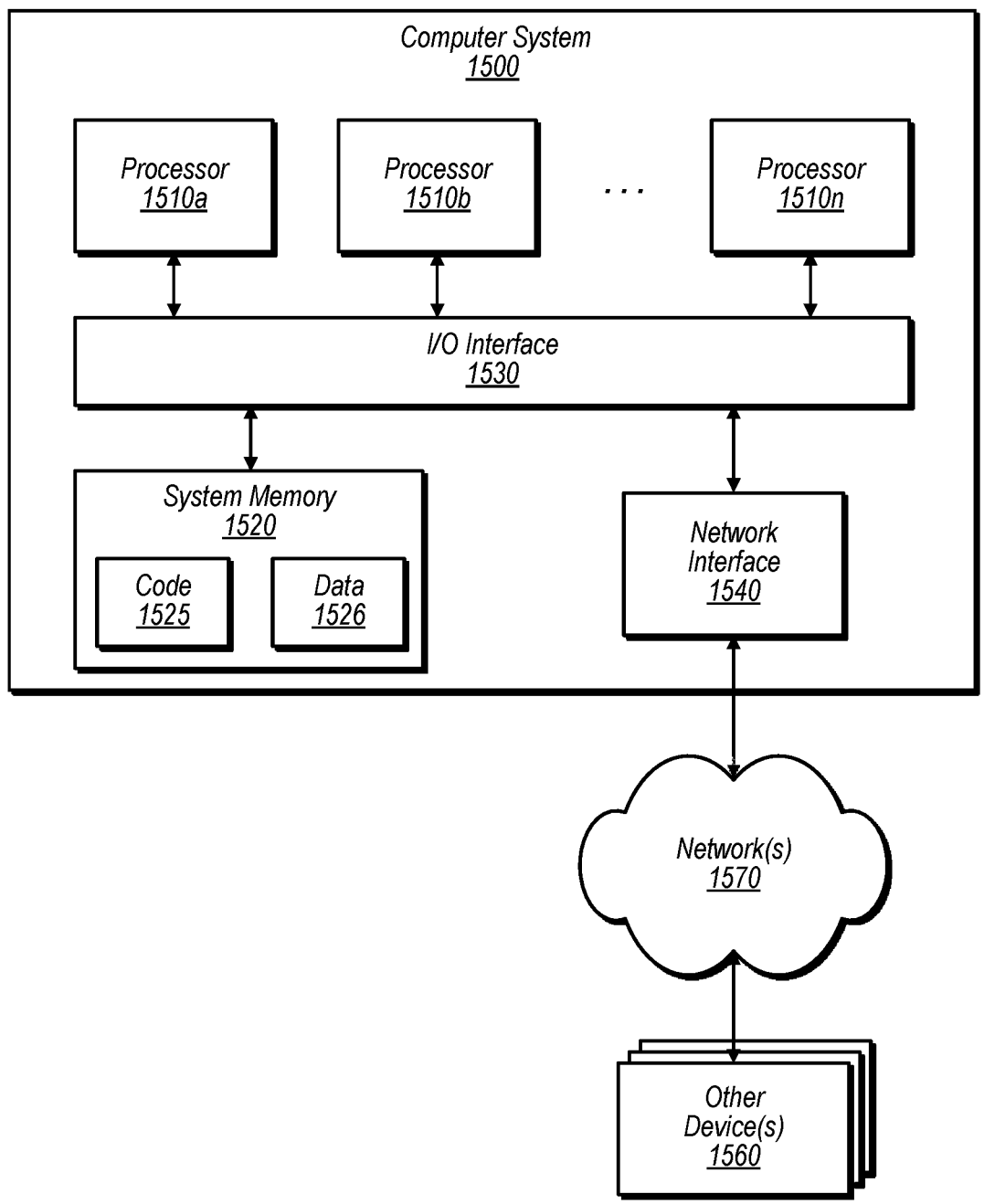
FIG. 15 is a block diagram illustrating an example computer system that may be used in some embodiments.

FIG. 15 is a block diagram illustrating an example computer system that may be used in some embodiments.

In some embodiments, a system that implements a portion or all of one or more of the technologies, including but not limited to a portion or all of apparatuses, methods and systems for performance index efficiency monitoring as described herein, may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as including but not limited to a portion or all of apparatuses, methods and systems for performance index efficiency monitoring, as described herein, are shown stored within system memory 1520 as code 1525 and data 1526.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIGS. 1 through 14, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data for implementing embodiments of performance index efficiency monitoring as described above relative to FIGS. 1-14. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
computing devices comprising a processor, a switch, or a memory, wherein the computing devices are configured to perform data operational work, and wherein the data operational work comprises computational work, data transfer work, or data storage work;
a power distribution system comprising power cabling configured to distribute electrical power from an electrical power source to:
respective sets of the computing devices; and
support equipment that support the respective sets of computing devices; and
one or more computing devices comprising a processor and a memory that stores program instructions, wherein the program instructions when executed on one or more processors of the one or more computing devices, cause the one or more computing devices to implement a monitoring system configured to:
determine an amount of data operational work performed over a period of time by a particular set of the respective sets of computing devices, wherein the amount of data operational work comprises an amount of computational work, data transfer work, or data storage work performed by the particular set of computing devices over the period of time;
determine an amount of electrical power consumed over the period of time by the particular set of computing devices and by a portion of the support equipment that support the particular set of computing devices;
determine a performance efficiency for the particular set of computing devices, wherein the performance efficiency indicates an amount of data operational work performed by the particular set of computing devices per unit of electrical power consumed by the particular set of computing devices and the support equipment that support the particular set of computing devices; and
cause an alarm to be indicated in response to determining the performance index efficiency for the particular set of computing devices deviates from a reference performance index efficiency by more than a threshold amount.

2. The data center of claim 1, wherein the monitoring system is further configured to:
store the performance efficiency in a depository; or
generate for display an indication of the performance efficiency.

3. The data center of claim 1, wherein to determine the amount of data operational work performed over the period of time by the particular set of computing devices, the monitoring system is further configured to:
receive data indicating respective amounts of data operational work performed by different computing devices of the set of computing devices over the period of time, wherein one of the different computing devices is configured to perform a type of data operational work comprising computational work, data transfer work, or data storage work, and another one of the different computing devices is configured to perform a different type of data operational work;
normalize the respective amounts of data operational work performed by the different computing devices, such that the normalized respective amounts of data operational work are based on a common measurement scale for data operational work; and
aggregate the respective normalized amounts of data operational work performed by the different computing devices of the particular set of computing devices over the period of time to determine the amount of data operational work performed by the particular set of computing devices over the period of time.

4. The data center of claim 1, wherein the amount of electrical power consumed over the period of time by the portion of the support equipment that support the particular set of computing devices comprises:
electrical power consumed over the period of time by a cooling system configured to cool the particular set of computing devices.

5. A method comprising:
determining an amount of data operational work performed over a period of time by a set of computing devices;
determining an amount of electrical power consumed over the period of time by the set of computing devices and by support equipment that supports the set of computing devices; and
determining a performance efficiency for the set of computing devices, wherein the performance efficiency indicates an amount of data operational work performed by the set of computing devices per unit of electrical power consumed by the set of computing devices and by the support equipment that supports the set of computing devices.

6. The method of claim 5, wherein one of the computing devices of the set of computing devices is configured to perform computational work, and wherein determining the amount of data operational work comprises:
determining a quantity of computational operations performed, by the computing device configured to perform computational work, during the period of time.

7. The method of claim 5, wherein one of the computing devices of the set of computing devices is configured to perform data transfer work, and wherein determining the amount of data operational work comprises:
determining a quantity of data transferred, by the computing device configured to perform data transfer work, during the period of time.

8. The method of claim 5, wherein one of the computing devices of the set of computing devices is configured to perform data storage work, and wherein determining the amount of data operational work comprises:
determining an amount of storage space made available for storage, by the computing device configured to perform data storage work, during the period of time; or
determining a quantity of data storage operations performed, by the computing device configured to perform data storage work, during the period of time.

9. The method of claim 5, wherein the set of computing devices comprises a single computing device.

10. The method of claim 5, wherein said determining an amount of data operational work performed over the period of time by the set of computing devices comprises:
normalizing respective amounts of data operational work performed by different computing devices of the set of computing devices configured to perform different types of data operational work, such that the normalized respective amounts of data operational work are based on a common measurement scale for data operational work; and
aggregating the normalized amounts of data operational work performed by the different computing devices of the set of computing device over the period of time to determine the amount of data operational work performed by the set of computing devices over the period of time.

11. The method of claim 10, further comprising:
prior to said normalizing, receiving data indicating respective amounts of data operational work performed by the different computing devices of the set of computing devices over the period of time,
wherein:
one of the different types of computing devices is a computing device configured to perform computational work, wherein the data indicates the amount of data operational work performed by the computing device configured to perform computational work in units of computation operations performed per period of time, and
another one of the different types of computing devices is:
a computing device configured to perform data transfer work, wherein the data indicates the amount of data operational work performed by the computing device configured to perform data transfer work in units of data transferred per period of time; or
a computing device configured to perform data storage work, wherein the data indicates the amount of data operational work performed by the computing device configured to perform data storage work in units of storage space made available during a given period time.

12. The method of claim 10, wherein one of the different types of computing devices is a computing device configured to perform more than one type of data operational work, wherein the data indicates the amount of data operational work performed by the computing device configured to perform multiple types of data operational work in units of a first type of data operational work and units of a second type of data operational work.

13. The method of claim 10, further comprising:
receiving an indication of a change in capacity for a type of computing device representative of a particular type of computing device of one of the computing devices of the set of computing devices;
adjusting the common measurement scale based on the changed capacity for the type of computing device; and
adjusting one of the normalized amounts of data operational work performed by a computing device of the particular type of computing device based on the adjusted common measurement scale.

14. The method of claim 5, further comprising:
repeating, for additional periods of time, said determining an amount of data operational work, said determining an amount of electrical power consumed, and said determining a performance efficiency;
storing the performance efficiency for the period of time and additional performance efficiencies for the additional periods of time in a depository; and
in response to a request, providing a history of performance efficiencies for the set of computing devices for the period of time and the additional periods of time.

15. The method of claim 5, further comprising:
determining an amount of data operational work performed over a period of time by another set of computing devices;
determining an amount of electrical power consumed over the period of time by the other set of computing devices and a support system that supports the other set of computing devices;
determining a performance efficiency for the other set of the computing devices;
determining a difference between the performance efficiency for the set of computing devices and the performance efficiency for the other set of computing devices; and
in response to determining the difference exceeds a threshold amount, causing an alarm to be issued.

16. A non-transitory computer readable storage medium storing program instructions that when executed on a computing device, cause the computing device to:
determine an amount of data operational work performed over a period of time by a set of computing devices;
determine an amount of electrical power consumed over the period of time by the set of computing devices and by support equipment that supports the set of computing devices; and
determine a performance efficiency for the set of the computing devices, wherein the performance efficiency indicates an amount of data operational work performed by the set of computing devices per unit of electrical power consumed by the set of computing devices and by the support equipment that supports the set of computing devices.

17. The non-transitory computer readable storage medium of claim 16, wherein the set of computing devices comprises computing devices configured to perform computational work, data transfer work, and data storage work;
wherein the program instructions when executed further cause the computing device to receive data indicating data operational work performed by the set of computing devices and data indicating power consumption, wherein the received data comprises:
data indicating an amount of computational operations performed by one of the computing devices of the set of computing devices during the period of time;
data indicating an amount of storage space made available for storage by one of the computing devices of the set of computing devices during the period of time; and
data indicating an amount of data transferred by one of the computing devices of the set of computing devices during the period of time; and
wherein to determine the amount of data operational work performed over the period of time by the set of computing devices the program instructions when executed on the computing device further:
normalize:
the amount of computational operations performed by the one of the computing devices during the period of time,
the amount of storage space made available for storage by one of the computing devices during the period of time, and
the amount of data transferred by one of the computing devices during the period of time,
such that the respective normalized amounts indicate amounts of data operational work performed by the respective computing devices based on a common measurement scale for data operational work; and
aggregate the respective normalized amounts of data operational work to determine the amount of data operational work performed by the set of computing devices over the period of time.

18. The non-transitory computer readable storage medium of claim 16, wherein the set of computing devices comprises a load balancer or a firewall device, and wherein the determined amount of data operational work performed over a period of time by the set of computing devices includes data operational work performed by the load balancer or the firewall device.

19. The non-transitory computer readable storage medium of claim 16, wherein the program instructions when executed further cause the computing device to receive data indicating data operational work performed by the set of computing devices, wherein the received data comprises a quantity of computing instances implemented via the set of computing devices; and
wherein the amount of data operational work performed over the period of time by the set of computing devices is determined based on the quantity of computing instances implemented via the set of computing devices.

20. The non-transitory computer readable storage medium of claim 16, wherein the program instructions when executed on the computing device, further cause the computing device to:
prior to said determine an amount of data operational work performed over the period of time by the set of computing devices, synchronize data indicating data operational work performed by the set of computing devices and data indicating power consumption such that respective amounts of data operational work performed during respective periods of time are synchronized with respective amounts of power consumed during the respective periods of time.

* * * * *